(12) United States Patent
Tiwari (10) Patent No.: US 8,655,305 B2
(45) Date of Patent: Feb. 18, 2014

(54) METHODS FOR REQUESTING EMERGENCY BEARER SERVICES FOR LOW PRIORITY DEVICES, AND APPARATUSES USING THE SAME

(75) Inventor: Kundan Tiwari, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 29 days.

(21) Appl. No.: 13/419,006

(22) Filed: Mar. 13, 2012

(65) Prior Publication Data

US 2012/0244828 A1 Sep. 27, 2012

Related U.S. Application Data

(60) Provisional application No. 61/454,861, filed on Mar. 21, 2011, provisional application No. 61/476,533, filed on Apr. 18, 2011.

(51) Int. Cl.
*H04W 88/02* (2009.01)

(52) U.S. Cl.
USPC ...................................................... 455/404.1

(58) Field of Classification Search
USPC ................ 455/404.1, 411, 434; 370/230, 328
See application file for complete search history.

(56) References Cited

U.S. PATENT DOCUMENTS

| | | | |
|---|---|---|---|
| 8,351,935 B2 * | 1/2013 | Umatt | 455/434 |
| 2010/0297979 A1 | 11/2010 | Watfa et al. | |
| 2012/0113895 A1 * | 5/2012 | Diachina et al. | 370/328 |
| 2012/0218889 A1 * | 8/2012 | Watfa et al. | 370/230 |
| 2012/0281566 A1 * | 11/2012 | Pelletier et al. | 370/252 |
| 2012/0289183 A1 * | 11/2012 | Tiwari | 455/404.1 |
| 2013/0016607 A1 * | 1/2013 | Tiwari | 370/230 |
| 2013/0016608 A1 * | 1/2013 | Tiwari | 370/230 |
| 2013/0040605 A1 * | 2/2013 | Zhang et al. | 455/411 |

OTHER PUBLICATIONS

3GPP TS 24.301 V10.1.0 (Dec. 2010); 3rd Generation Partnership Project; Technical Specification Group Core Network and Terminals; Non-Access-Stratum (NAS) protocol for Evolved Packet System (EPS); Stage 3 (Release 10); XP050462346; 305 pages.
HCT et al: 3GPP TSG CT WG1 Meeting #73, St Julians (Malta), Aug. 22-26, 2011; C1-113281; Defining new service type to handle PS emergency call; XP050533801; 6 pages.
Research in Motion et al: 3GPP TSG-CT WG1 Meeting #70, Salt Lake City, Utah (USA), Feb. 21-25, 2011; C1-111521, Service Type for machine-to-machine communication-24.301; XP050480849; 7 pages.
Research in Motion; 3GPP TSG-CT WG1 Meeting #70, Salt Lake City, Utah (USA), Feb. 21-25, 2011; C1-111165; Device properties and RRC establishment cause; XP050480586; 3 pages.

* cited by examiner

*Primary Examiner* — Diane Mizrahi
(74) *Attorney, Agent, or Firm* — Birch, Stewart, Kolasch & Birch, LLP.

(57) ABSTRACT

A mobile communication device configured for Non Access Stratum (NAS) signaling low priority is provided. In the mobile communication device, a wireless module performs wireless transmissions and receptions to and from a service network, and a controller module originates an EXTENDED SERVICE REQUEST message for requesting emergency bearer services in an EMM IDLE mode. The controller module further transmits an RRC CONNECTION REQUEST message comprising an establishment cause indicating an emergency case to the service network via the wireless module in response to originating the EXTENDED SERVICE REQUEST message.

16 Claims, 7 Drawing Sheets

METHODS FOR REQUESTING EMERGENCY BEARER SERVICES FOR LOW PRIORITY DEVICES, AND APPARATUSES USING THE SAME

CROSS REFERENCE TO RELATED APPLICATIONS

This Application claims priority of U.S. Provisional Application No. 61/454,861, filed on Mar. 21, 2011, and the entirety of which is incorporated by reference herein. This Application also claims priority of U.S. Provisional Application No. 61/476,533, filed on Apr. 18, 2011, and the entirety of which is incorporated by reference herein.

BACKGROUND OF THE INVENTION

1. Field of the Invention

The invention generally relates to the handling of requests for emergency bearer services, and more particularly, to methods for requesting emergency bearer services for low priority devices, and apparatuses using the same.

2. Description of the Related Art

For a long time, various machines have been provided to make our lives more convenient in every way. Generally, machines, nowadays, are equipped with computing processors and software to accommodate us with more intelligence-based services. With the advancement of wireless communications, Machine Type Communication (MTC) has been developed to enable communications between remote machines for exchanging information and operating without human interaction. Especially for critical public infrastructures, such as water treatment facilities or bridges, MTC sensors may be employed to monitor the operation statuses of facilities and report measurement results back to control centers using various wireless access technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LIE) technology, LTE-Advanced technology, and others.

Take the LTE technology in compliance with the 3GPP TS 24.301 specification, v10.3.0 (referred to herein as the TS 24.301 specification) as an example. A low priority indicator or MTC indicator is defined for indicating that a User Equipment (UE) has low priority for Non Access Stratum (NAS) signaling and is generally tolerant to delays. A UE may be configured for NAS signaling low priority when manufactured, and/or when accessing the service network, by Open Mobile Alliance (OMA) Device Management (DM) and/or Subscriber Identity Module/Universal Subscriber Identity Module (SIM/USIM) Over-The-Air (OTA). For a UE configured for NAS signaling low priority (also referred to as a low priority device), the RRC establishment cause used during originating an EXTENDED SERVICE REQUEST message for requesting packet services is always set to "Delay tolerant", even if the packet services are for emergency bearer services. As a result, the emergency bearer services will not be prioritized as they should be.

BRIEF SUMMARY OF THE INVENTION

In order to solve the above-mentioned problem, the invention proposes to explicitly indicate the emergency case when originating an EXTENDED SERVICE REQUEST message for requesting emergency bearer services, so that the emergency bearer services may be prioritized in the AS layer and/or the NAS layer.

In a first aspect of the invention, a mobile communication device configured for NAS signaling low priority is provided. The mobile communication device comprises a wireless module and a controller module. The wireless module performs wireless transmissions and receptions to and from a service network. The controller module originates an EXTENDED SERVICE REQUEST message for requesting emergency bearer services in an EMM IDLE mode, and transmits an RRC CONNECTION REQUEST message comprising an establishment cause indicating an emergency case to the service network via the wireless module in response to originating the EXTENDED SERVICE REQUEST message.

In a second aspect of the invention, a method for handling a request for emergency bearer services by a mobile communication device configured for NAS signaling low priority is provided. The method comprises the steps of originating an EXTENDED SERVICE REQUEST message for requesting emergency bearer services in an EMM IDLE mode, and transmitting an RRC CONNECTION REQUEST message comprising an establishment cause indicating an emergency case to a service network in response to originating the EXTENDED SERVICE REQUEST message.

In a third aspect of the invention, a mobile communication device configured for NAS signaling low priority is provided. The mobile communication device comprises a wireless module and a controller module. The wireless module performs wireless transmissions and receptions to and from a service network. The controller module originates an EXTENDED SERVICE REQUEST message for requesting emergency bearer services, and includes a service type in the EXTENDED SERVICE REQUEST message to indicate that the request is for the emergency bearer services. Also, the controller module transmits the EXTENDED SERVICE REQUEST message to the service network via the wireless module.

In a fourth aspect of the invention, a method for handling a request for emergency bearer services by a mobile communication device configured for NAS signaling low priority is provided. The method comprises the steps of originating an EXTENDED SERVICE REQUEST message for requesting emergency bearer services, including a service type in the EXTENDED SERVICE REQUEST message to indicate that the request is for the emergency bearer services, and transmitting the EXTENDED SERVICE REQUEST message to a service network.

Other aspects and features of the present invention will become apparent to those with ordinarily skill in the art upon review of the following descriptions of specific embodiments of mobile communication devices and methods for handling a request for emergency bearer services in low priority devices.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the 3GPP specification(s) described herein are used to teach the spirit of the invention, and the invention is not limited thereto.

Figure 1:
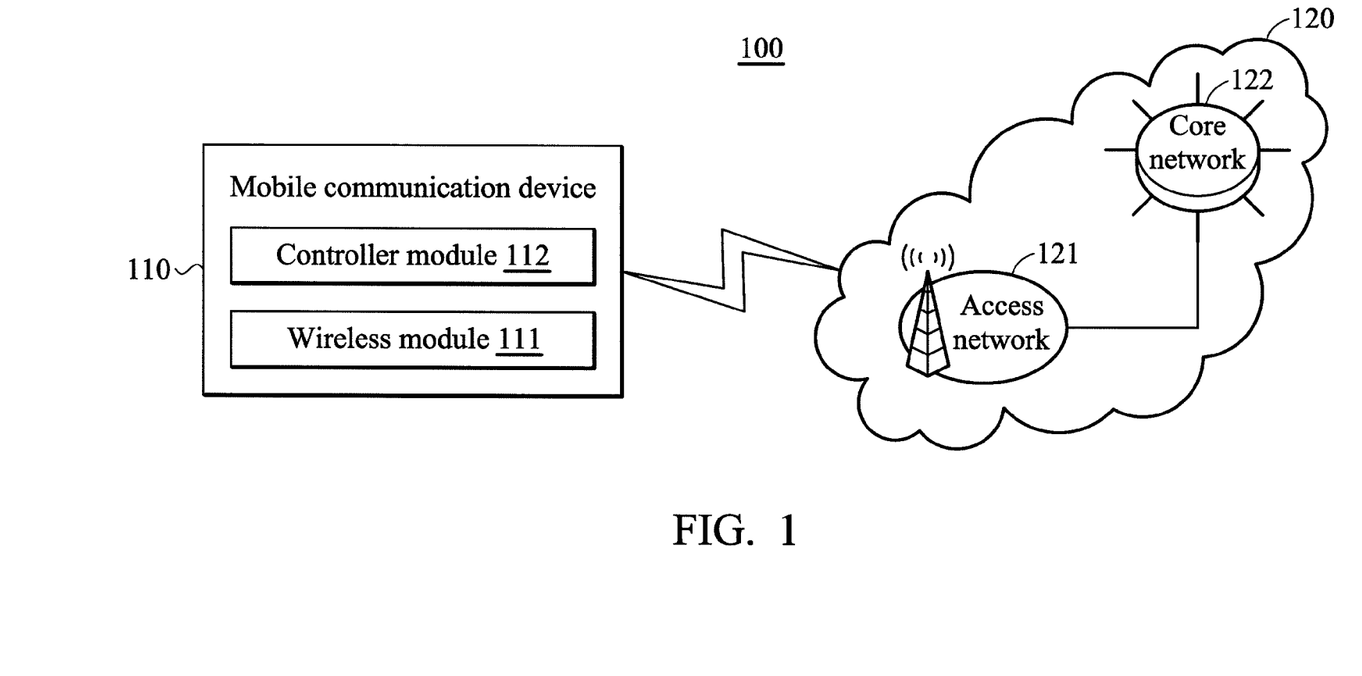
FIG. 1 is a block diagram illustrating a mobile communication environment according to an embodiment of the invention.

FIG. 1 is a block diagram illustrating a mobile communication environment according to an embodiment of the invention. In the mobile communication environment 100, the mobile communication device 110 is configured for NAS signaling low priority, and is wirelessly connected to the service network 120 for obtaining wireless services. The service network 120 may comprise an access network 121 and a core network 122, wherein the access network 121 may be an Evolved Universal Mobile Telecommunications System (UMTS) Terrestrial Radio Access Network (E-UTRAN) which may comprise at least one eNode-B (eNB), and the core network 122 may be an Evolved Packet Core (EPC) in the LTE/LTE-Advanced technology. The mobile communication device 110 comprises a wireless module 111 for performing the functionality of wireless transmissions and receptions to and from the service network 120, and a controller module 112 for controlling the operation of the wireless module 111 to carry out the communications with the service network 120 in compliance with the communication protocol in use. Taking the LIE technology for example, the communication protocol stack may generally comprise a NAS layer and an AS layer, wherein the NAS layer is a functional layer for providing the signaling and traffic between the mobile communication device 110 and the core network 122, and the AS layer is a functional layer for providing the signaling and traffic between the mobile communication device 110 and the access network 121. Also, the controller module 112 may further control the operation of other functional components, such as a display unit and/or keypad serving as the Man-Machine Interface (MMI), a storage unit storing the program codes of applications, or others. To further clarify, the wireless module 111 may be a Radio Frequency (RF) unit, and the controller module 112 may be a general-purpose processor or a Micro-Control Unit (MCU) of a baseband unit. The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 2100 MHz, or 2.6 GHz utilized in LTE/LTE-Advanced systems, or others depending on the Radio Access Technology (RAT) in use.

Figure 2A:
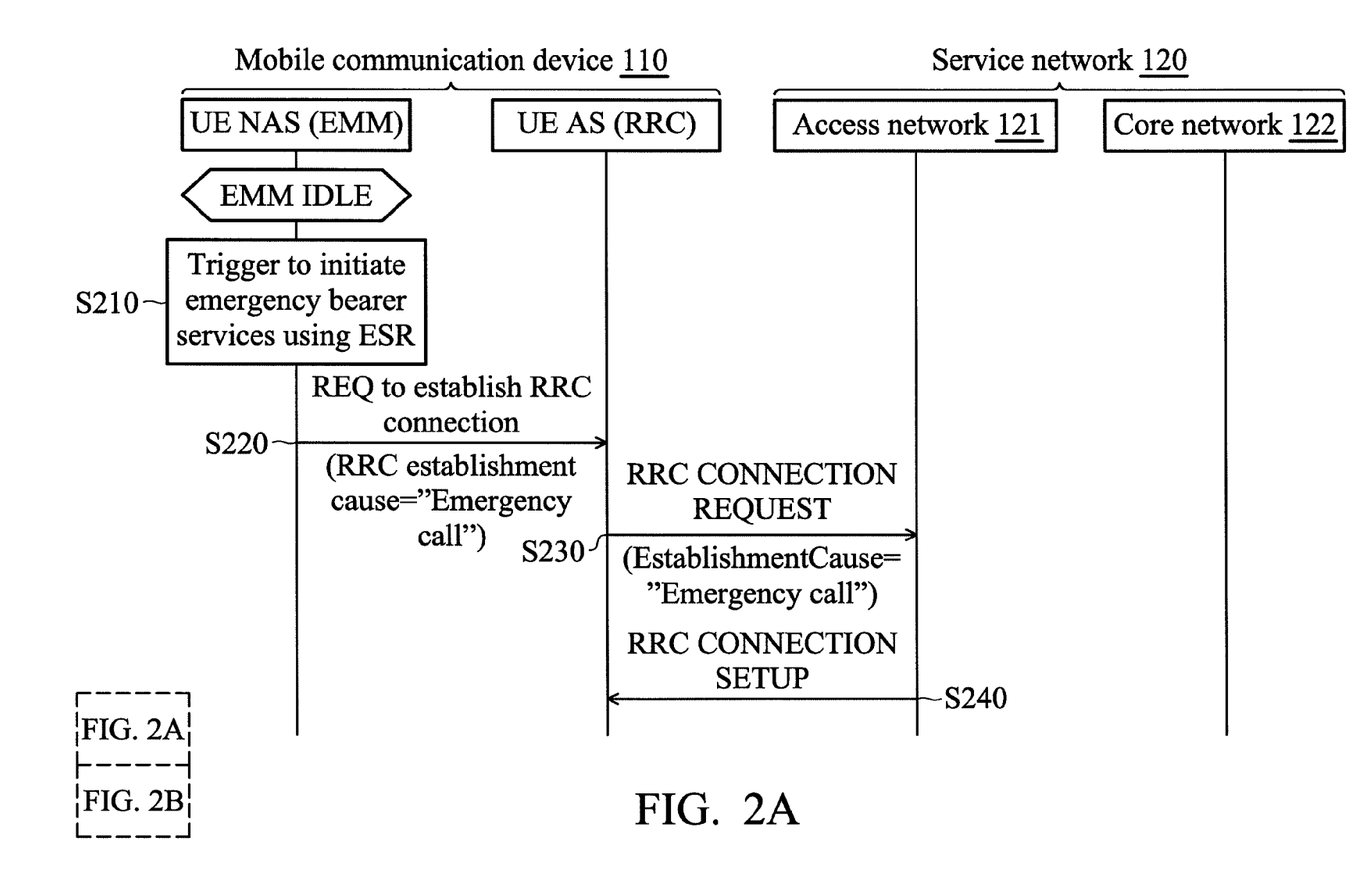
FIGS. 2A and 2B show a message sequence chart illustrating the handling of a request for emergency bearer services according to an embodiment of the invention.
Figure 2B:
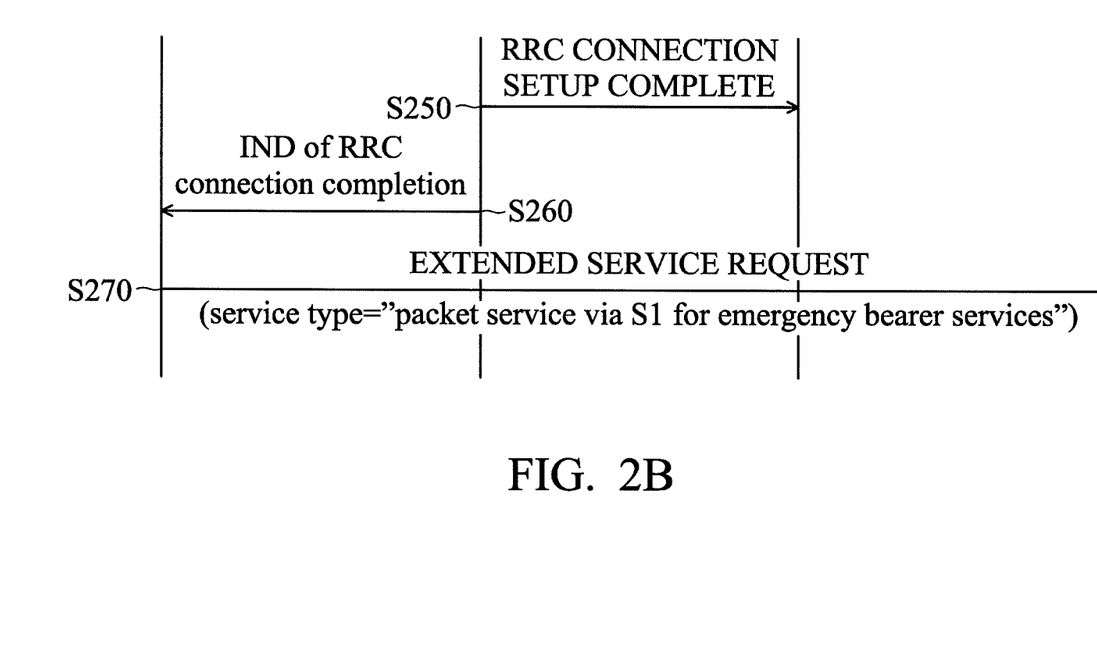

To be more specific, the controller module 112 controls the wireless module 111 for handling a request for emergency bearer services. FIGS. 2A and 2B show a message sequence chart illustrating the handling of a request for emergency bearer services according to an embodiment of the invention. In this embodiment, the handling of the request for emergency bearer services takes place in the mobile communication device 110. For brevity, the NAS layer and AS layer of the communication protocol at the side of the mobile communication device 110 are referred to herein as the UE NAS layer and the UE AS layer, respectively. As shown in FIG. 2A, the UE NAS layer is initially in the EPS (Evolved Packet System) Mobility Management (EMM) IDLE mode, and then triggers to initiate emergency bearer services using an EXTENDED SERVICE REQUEST (ESR) message (step S210). In other words, the UE NAS layer originates the EXTENDED SERVICE REQUEST message for requesting emergency bearer services. Next, the UE NAS layer requests the UE AS layer to establish a Radio Resource Control (RRC) connection for the emergency bearer services (step S220). Specifically, the request comprises an RRC establishment cause which is set to "Emergency call". In response to the request, the UE AS layer transmits to the access network 121 an RRC CONNECTION REQUEST message comprising an establishment cause which is set to "Emergency call" to indicate an emergency case according to the RRC establishment cause (step S230).

When receiving the RRC CONNECTION REQUEST message, the access network 121 recognizes that the request is for an emergency case according to the received establishment cause, so it replies to the UE AS layer with an RRC CONNECTION SETUP message (step S240). The RRC CONNECTION SETUP message may comprise the parameters and configurations for establishing the RRC connection. When receiving the RRC CONNECTION SETUP message, the UE AS layer establishes an RRC connection according to the received parameters and configurations, and then transmits an RRC CONNECTION SETUP COMPLETE message to the access network 121 (step S250), to complete the RRC connection establishment.

Subsequently, the UE AS layer further indicates the completion of the RRC connection establishment to the UE NAS layer (step S260). After that, the UE NAS layer include a service type Information Element (IE) which is set to "packet service via S1 for emergency bearer services" in the EXTENDED SERVICE REQUEST message, and then transmits the EXTENDED SERVICE REQUEST message to the core network 122 (step S270). Thus, with the setting of the establishment cause to "Emergency call", both of the UE AS layer and the access network 121 (i.e., the AS layer of the communication protocol at the network side) prioritize the connection establishment and so will further prioritize the requested emergency bearer services. In addition, with the setting of the service type to "packet service via S1 for emergency bearer services", both of the UE NAS layer and the core network 122 (i.e., the NAS layer of the communication protocol at the network side) will prioritize the requested emergency bearer services.

In another embodiment, the service type IE in the EXTENDED SERVICE REQUEST message may be set to "packet service via S1" instead, and the prioritization of the emergency bearer services may be achieved only by the setting of the establishment cause to "Emergency call" in the UE AS layer.

Figure 3A:
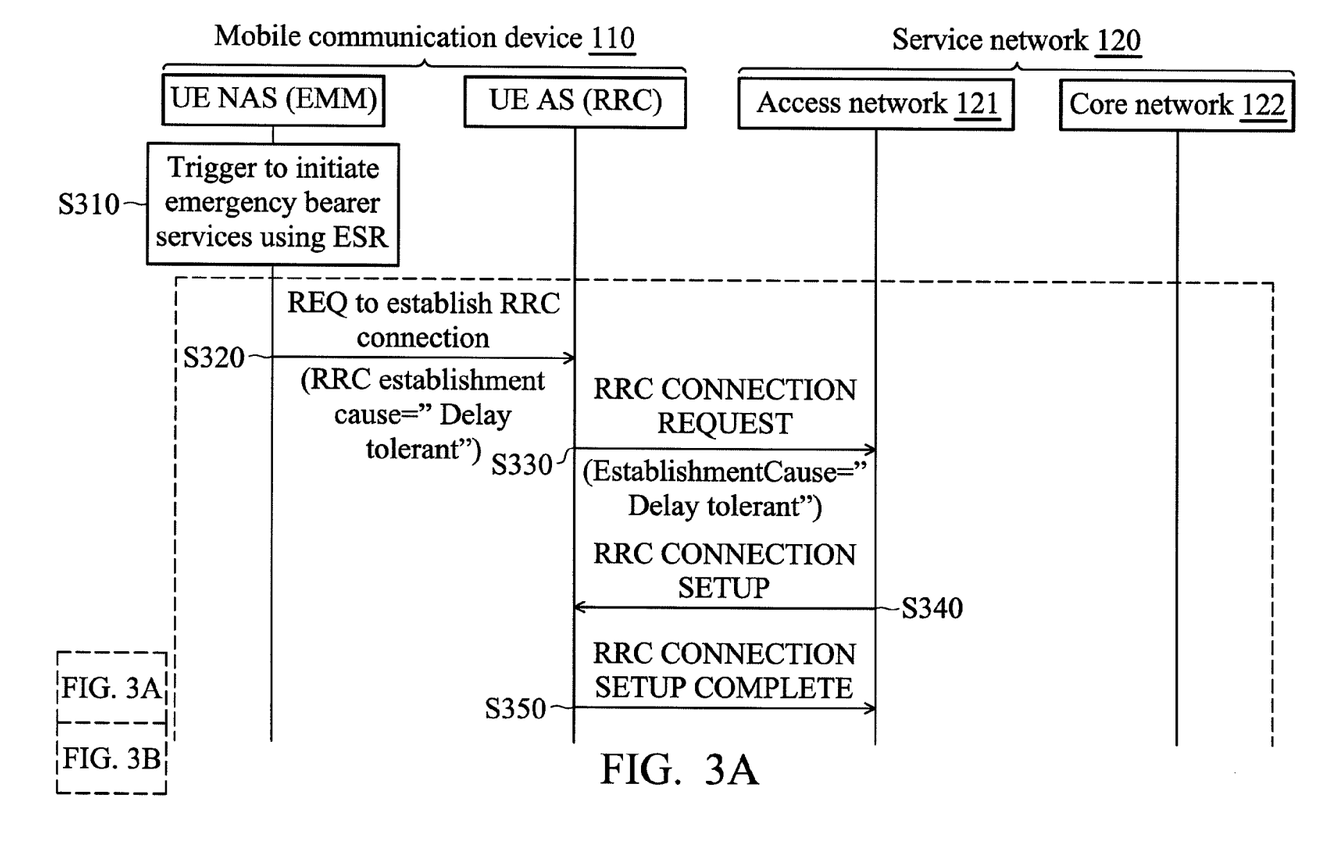
FIGS. 3A and 3B show a message sequence chart illustrating the handling of a request for emergency bearer services according to another embodiment of the invention.
Figure 3B:
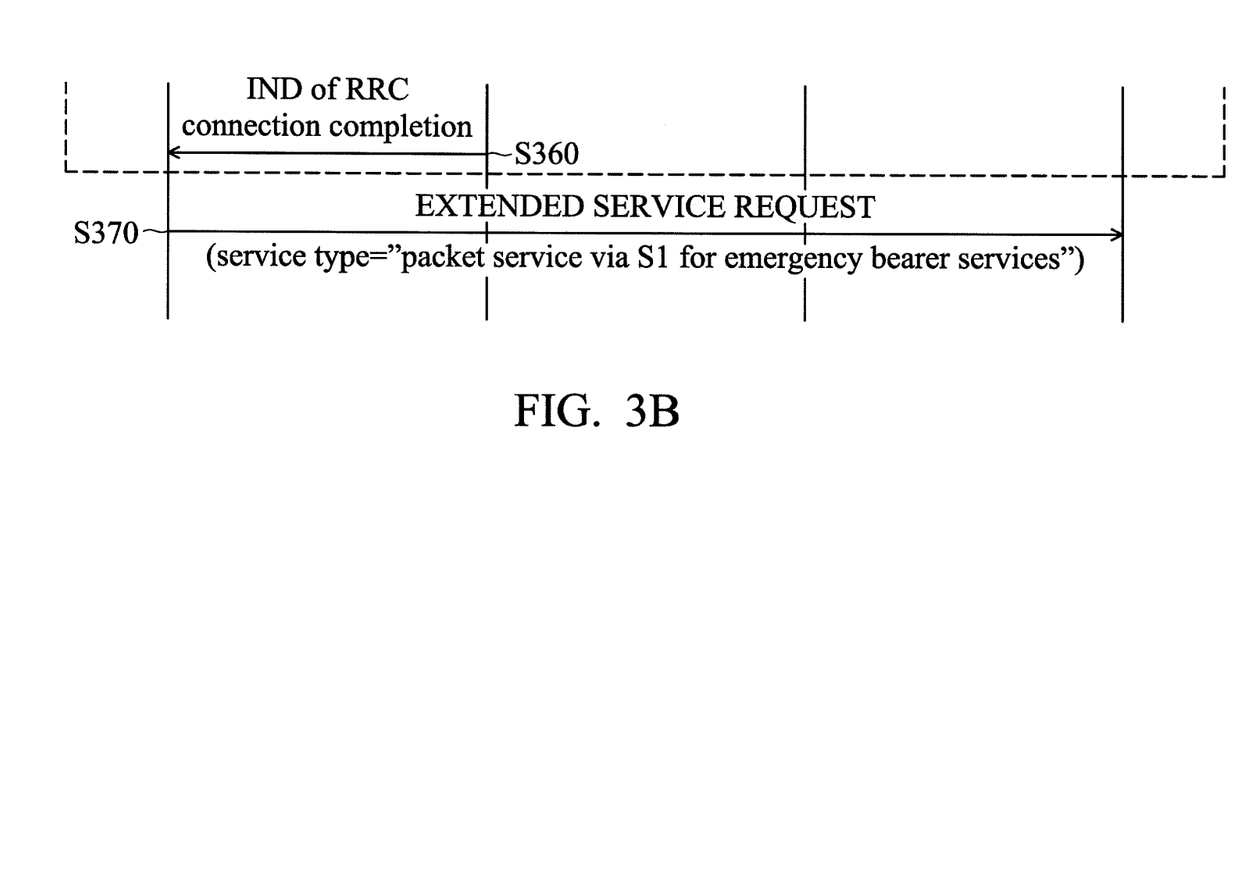

FIGS. 3A and 3B show a message sequence chart illustrating the handling of a request for emergency bearer services according to another embodiment of the invention. Similar to FIGS. 2A and 2B, the handling of the request for emergency bearer services takes place in the mobile communication device 110. In this embodiment, the UE NAS layer may be initially in the EMM IDLE mode or the EMM CONNECTED mode, and then be triggered to establish emergency bearer services using an EXTENDED SERVICE REQUEST message (step S310). For the case of the UE NAS layer being in the EMM IDLE mode, the UE NAS layer may request the UE AS layer to establish an RRC connection for the emergency bearer services, with an RRC establishment cause set to "Delay tolerant" (step S320), and then the UE AS layer may perform a connection establishment procedure according to the RRC establishment cause (steps S330~S350) and indicate the completion of the connection establishment procedure to the UE NAS layer (step S360). Note that, the steps S320~S360 are optional and denoted by a dotted block in FIGS. 3A and 3B, and the steps S330~S350 are similar to steps S230~S250 in FIGS. 2A and 2B except with different establishment cause. After that, the UE NAS layer transmits the EXTENDED SERVICE REQUEST message to the core network 122, wherein the EXTENDED SERVICE REQUEST message comprises a service type IE which is set to "packet service via S1 for emergency bearer services" (step S370).

For the case of the UE NAS layer being in the EMM CONNECTED mode, the RRC connection has already been established between the UE AS layer and the access network 121 and the UE NAS layer has already been attached to the core network 122, so the steps S320~360 may be skipped to proceed to the step S370 directly. Thus, with the setting of the service type to "packet service via S1 for emergency bearer services", both of the UE NAS layer and the core network 122 (i.e., the NAS layer of the communication protocol at the network side) will prioritize the requested emergency bearer services.

Note that, in FIGS. 2A, 2B, 3A, and 3B, detailed descriptions of other related operations for the service request procedure are omitted herein since they are beyond the scope of the invention, and references may be made to the TS 24.301 specification.

Figure 4:
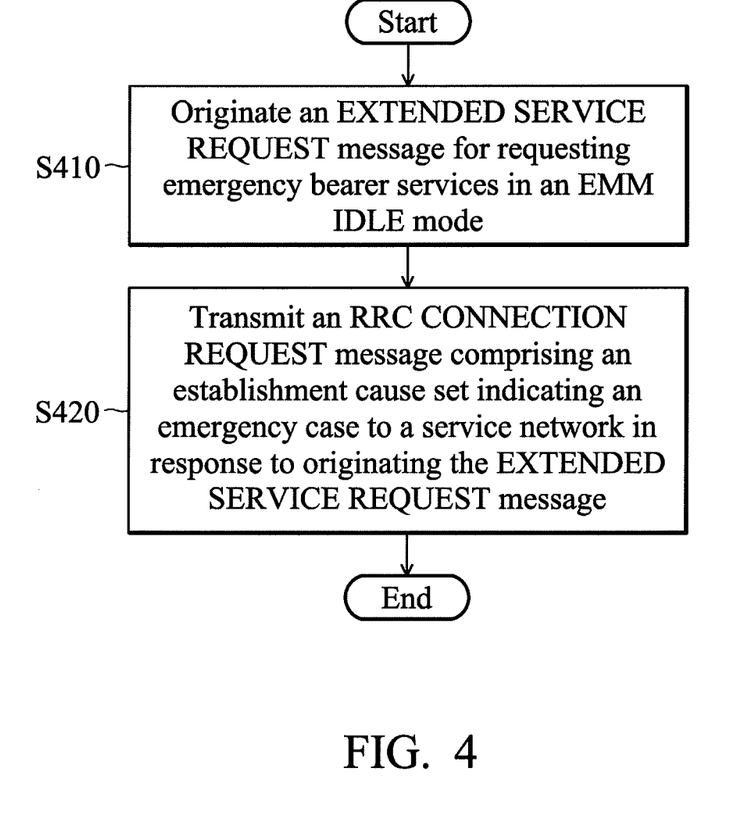
FIG. 4 is a flow chart illustrating the method for handling a request for emergency bearer services according to an embodiment of the invention.

FIG. 4 is a flow chart illustrating the method for handling a request for emergency bearer services according to an embodiment of the invention. In this embodiment, the method may be applied to any mobile communication device which is configured for NAS signaling low priority. To begin the method, the mobile communication device originates an EXTENDED SERVICE REQUEST message for requesting emergency bearer services in an EMM IDLE mode (step S410). Next, the mobile communication device transmits an RRC CONNECTION REQUEST message comprising an establishment cause indicating an emergency case to a service network in response to originating the EXTENDED SERVICE REQUEST message (step S420). To further clarify, the origination of the EXTENDED SERVICE REQUEST message may be triggered by the NAS layer of the communication protocol in the mobile communication device, and the transmission of the RRC CONNECTION REQUEST message may be performed by the AS layer of the communication protocol in the mobile communication device in response to receiving a request from the NAS layer for establishing an RRC connection. Particularly, the request may include an RRC establishment cause to indicate the setting of the establishment cause in the RRC CONNECTION REQUEST message to "Emergency call". Thus, with the establishment cause indicating an emergency case, both of the AS layers at the UE side and the network side will prioritize the RRC connection establishment, so that the requested emergency bearer services may be further prioritized.

Figure 5:
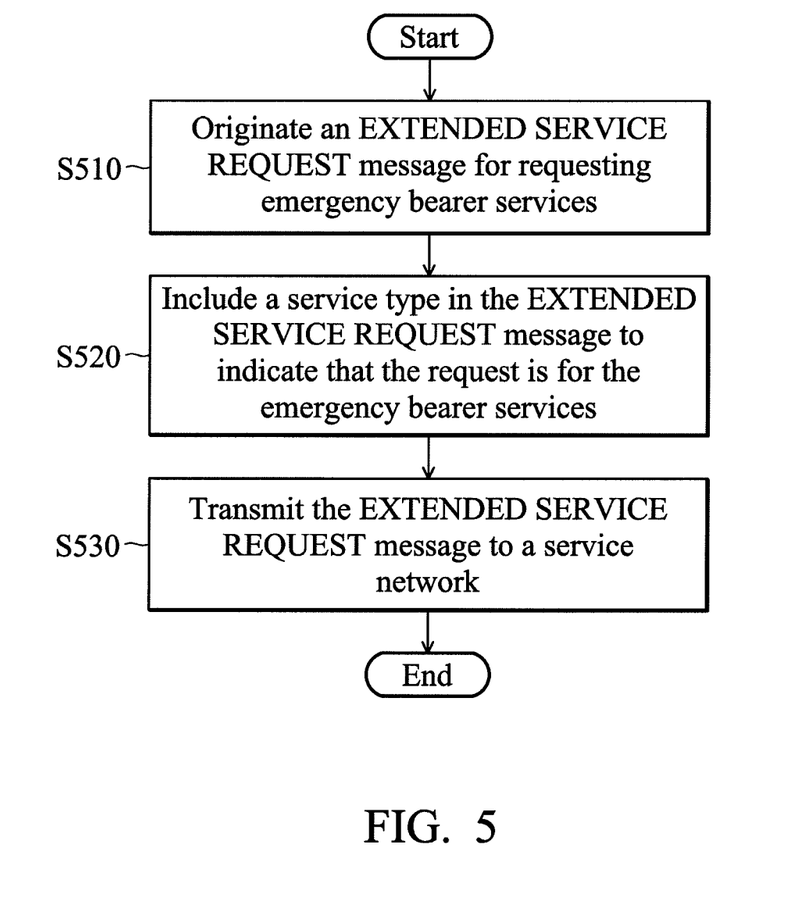
FIG. 5 is a flow chart illustrating the method for handling a request for emergency bearer services according to another embodiment of the invention.

FIG. 5 is a flow chart illustrating the method for handling a request for emergency bearer services according to another embodiment of the invention. Similar to FIG. 4, the method may be applied to any mobile communication device which is configured for NAS signaling low priority. To begin the method, the mobile communication device originates an EXTENDED SERVICE REQUEST message for requesting emergency bearer services (step S510). Also, the mobile communication device includes a service type in the EXTENDED SERVICE REQUEST message to indicate that the request is for the emergency bearer services (step S520), and then transmits the EXTENDED SERVICE REQUEST message to a service network (step S530). In another embodiment, if the mobile communication device is in the EMM IDLE mode when originating the EXTENDED SERVICE REQUEST message, it may perform establishment of an RRC connection before the step S530. To further clarify, the origination of the EXTENDED SERVICE REQUEST message may be triggered by the NAS layer of the communication protocol in the mobile communication device, and the service type may be set to "packet service via S1 for emergency bearer services" to indicate the emergency case. Thus, with the setting of the service type, both of the NAS layers at the UE side and the network side will prioritize the requested emergency bearer services.

While the invention has been described by way of example and in terms of preferred embodiment, it is to be understood that the invention is not limited thereto. Those who are skilled in this technology can still make various alterations and modifications without departing from the scope and spirit of this invention. For example, the method for handling a request for emergency bearer services may also be applied to any low priority devices in compliance with any evolutionary technology of the LTE/LTE-Advanced technology. Therefore, the scope of the present invention shall be defined and protected by the following claims and their equivalents.

What is claimed is:

1. A mobile communication device, configured for Non Access Stratum (NAS) signaling low priority, comprising:
a wireless module performing wireless transmissions and receptions to and from a service network; and
a processor originating an EXTENDED SERVICE REQUEST message for requesting emergency bearer services in an EPS (Evolved Packet System) Mobility Management (EMM) IDLE mode of a NAS layer, and transmitting an RRC CONNECTION REQUEST message comprising an establishment cause indicating an emergency case to the service network via the wireless module in response to originating the EXTENDED SERVICE REQUEST message.

2. The mobile communication device of claim 1, wherein the establishment cause in the RRC CONNECTION REQUEST message is set to "Emergency call" to indicate the emergency case, according to an RRC establishment cause of a NAS layer.

3. The mobile communication device of claim 1, wherein the emergency bearer services are prioritized in an Access Stratum (AS) layer in response to the establishment cause indicating the emergency case.

4. The mobile communication device of claim 1, wherein the processor further receives an RRC CONNECTION SETUP message corresponding to the RRC CONNECTION REQUEST message from the service network via the wireless module, and transmits an RRC CONNECTION SETUP COMPLETE message to the service network via the wireless module in response to receiving the RRC CONNECTION SETUP message.

5. The mobile communication device of claim 4, wherein the processor further includes a service type in the EXTENDED SERVICE REQUEST message to indicate that the request is for the emergency bearer services, and transmits the EXTENDED SERVICE REQUEST message to the service network via the wireless module in response to the transmission of the RRC CONNECTION SETUP COMPLETE message.

6. The mobile communication device of claim 5, wherein the emergency bearer services are prioritized in the NAS layer in response to the service type indicating that the request is for the emergency bearer services.

7. A method for handling a request for emergency bearer services by a mobile communication device configured for NAS signaling low priority, comprising:
originating an EXTENDED SERVICE REQUEST message for requesting emergency bearer services in an EPS (Evolved Packet System) Mobility Management (EMM) IDLE mode of a NAS layer; and
transmitting an RRC CONNECTION REQUEST message comprising an establishment cause indicating an emergency case to a service network in response to originating the EXTENDED SERVICE REQUEST message.

8. The method of claim 7, wherein the establishment cause in the RRC CONNECTION REQUEST message is set to "Emergency call" to indicate the emergency case, according to an RRC establishment cause of a NAS layer.

9. The method of claim 7, wherein the emergency bearer services are prioritized in an AS layer in response to the establishment cause indicating the emergency case.

10. The method of claim 7, further comprising receiving an RRC CONNECTION SETUP message corresponding to the RRC CONNECTION REQUEST message from the service network, and transmitting an RRC CONNECTION SETUP COMPLETE message to the service network in response to receiving the RRC CONNECTION SETUP message.

11. The method of claim 10, further comprising including a service type in the EXTENDED SERVICE REQUEST message to indicate that the request is for the emergency bearer services, and transmitting the EXTENDED SERVICE REQUEST message to the service network in response to the transmission of the RRC CONNECTION SETUP COMPLETE message.

12. The method of claim 11, wherein the emergency bearer services are prioritized in the NAS layer in response to the service type indicating that the request is for the emergency bearer services.

13. A mobile communication device, configured for NAS signaling low priority, comprising:
a wireless module performing wireless transmissions and receptions to and from a service network; and
a processor originating an EXTENDED SERVICE REQUEST message for requesting emergency bearer services, including a service type in the EXTENDED SERVICE REQUEST message to indicate that the request is for the emergency bearer services, and transmitting the EXTENDED SERVICE REQUEST message to the service network via the wireless module.

14. The mobile communication device of claim 13, wherein the emergency bearer services are prioritized in a NAS layer in response to the service type indicating that the request is for the emergency bearer services.

15. A method for handling a request for emergency bearer services by a mobile communication device configured for NAS signaling low priority, comprising:
originating an EXTENDED SERVICE REQUEST message for requesting emergency bearer services;
including a service type in the EXTENDED SERVICE REQUEST message to indicate that the request is for the emergency bearer services; and
transmitting the EXTENDED SERVICE REQUEST message to a service network.

16. The method of claim 15, wherein the emergency bearer services are prioritized in a NAS layer in response to the service type indicating that the request is for the emergency bearer services.

* * * * *